United States Patent Office 3,398,273
Patented Aug. 20, 1968

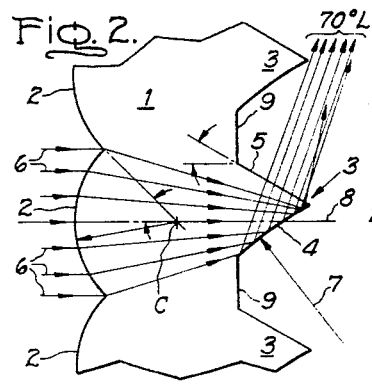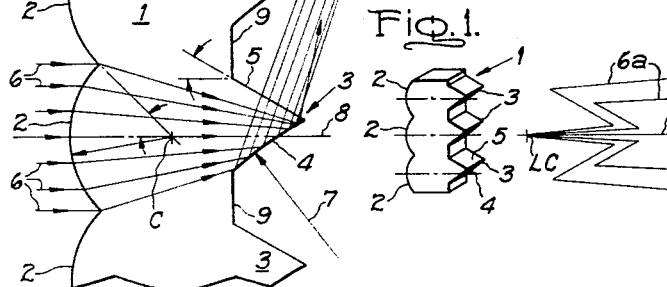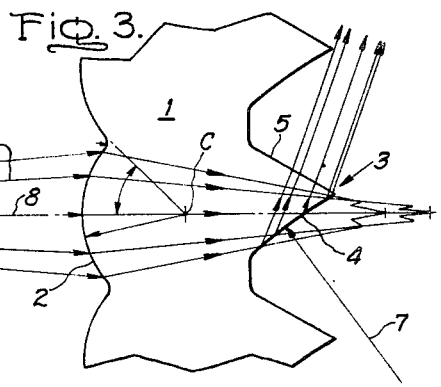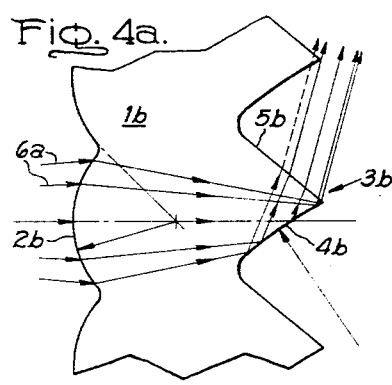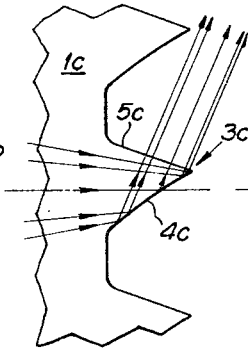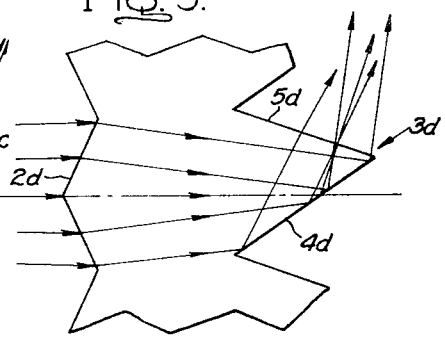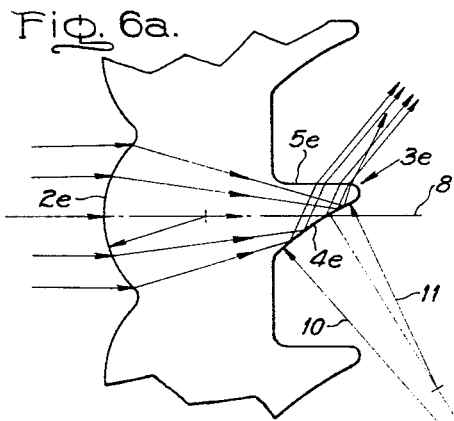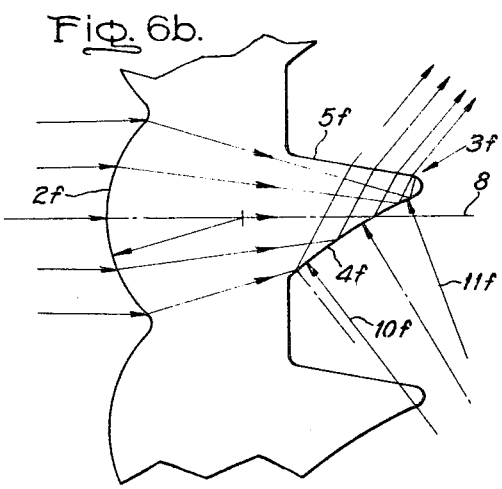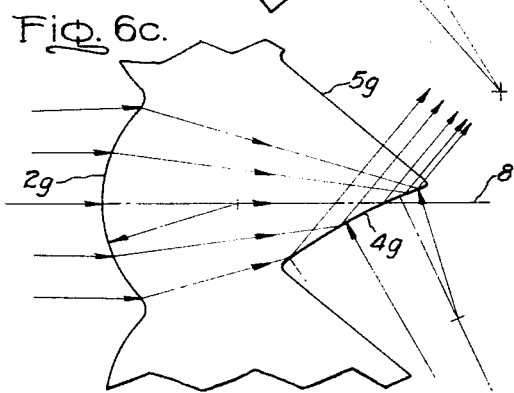
Inventors:
Charles H. Rex
Marvin L. Brom
by Henry P. Truesdell
Their Attorney

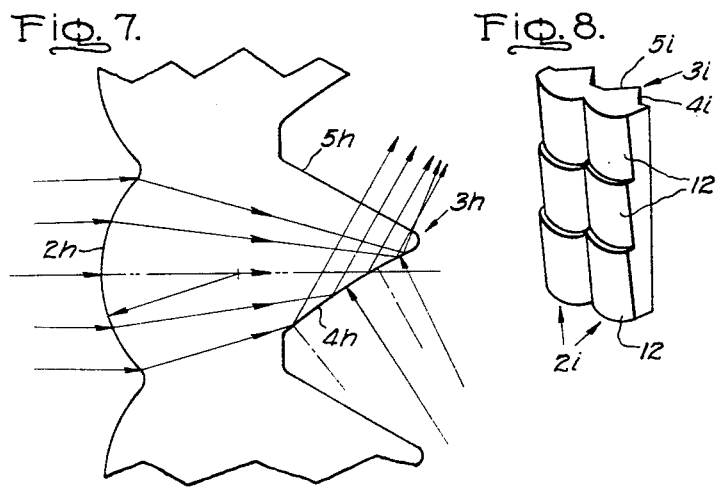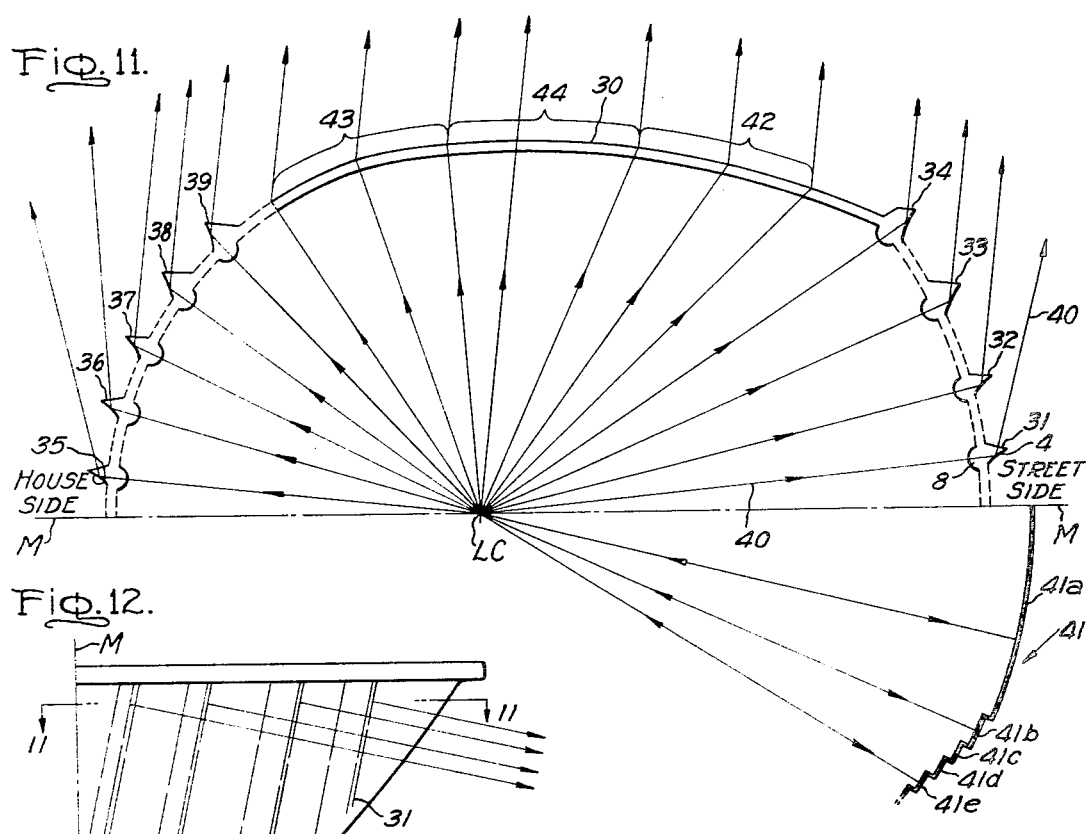

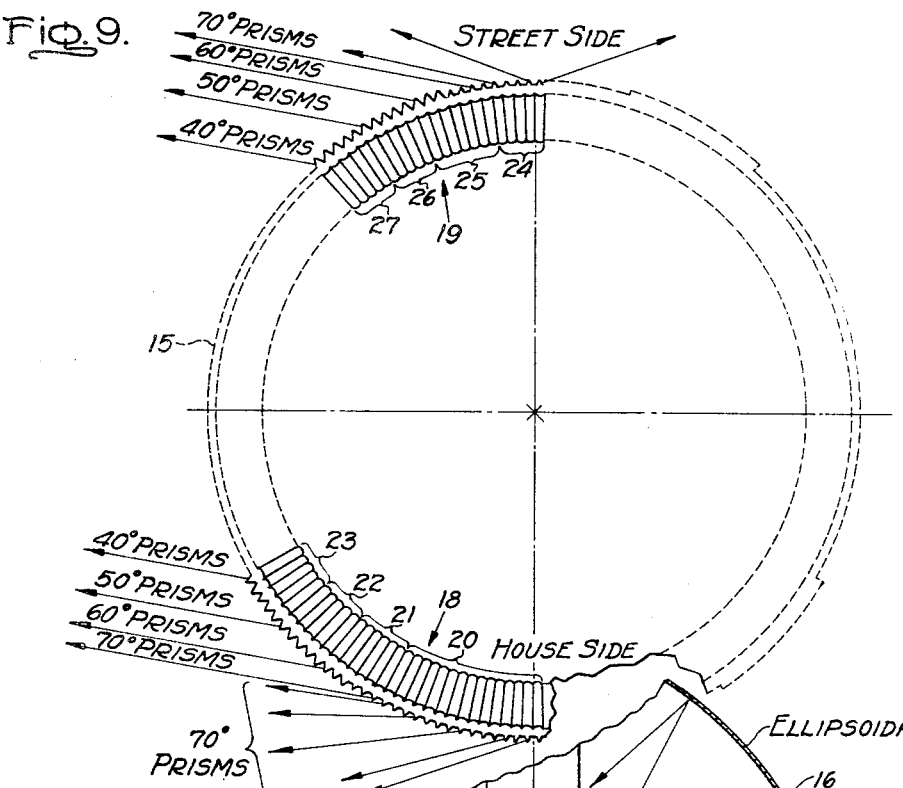
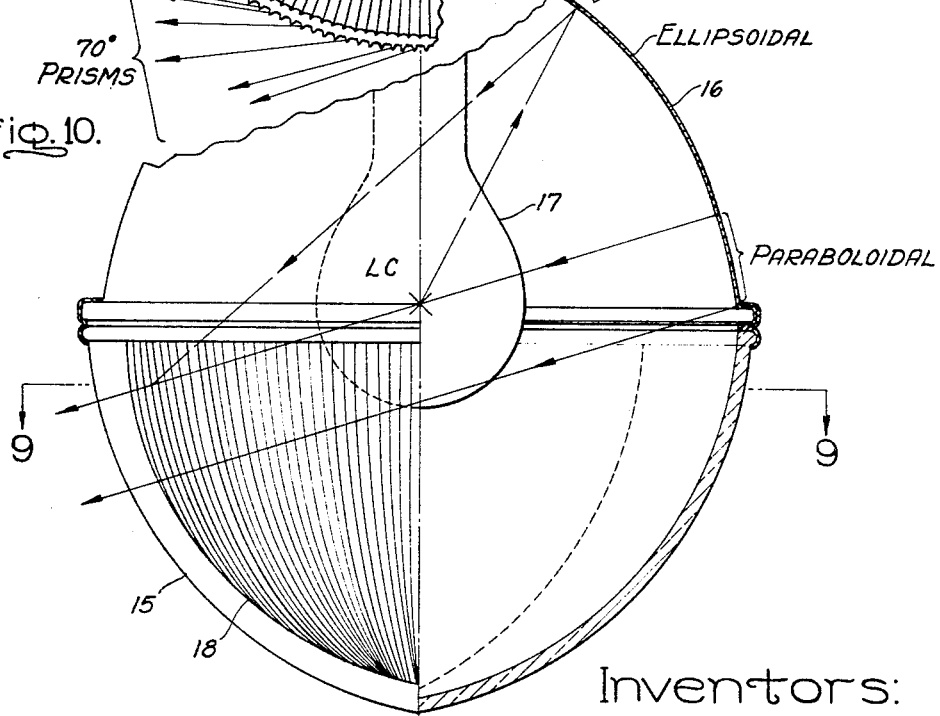

3,398,273
LUMINAIRE WITH OPTICAL REFRACTING
MEMBERS
Charles H. Rex, Hendersonville, N.C., and Marvin L. Brom, Blacksburg, Va., assignors to General Electric Company, a corporation of New York
Filed Sept. 1, 1961, Ser. No. 135,659
5 Claims. (Cl. 240—93)

This invention relates to optical refractors, and it is an object of the invention to provide a prismatic light transmitting refractor member which will refract light through large angles at high efficiency.

In many applications it is desirable to bend or refract light through large angles at the surface of a refractor. The provision of a series of conventional prisms on a surface of the refractor for bending the light in a given direction becomes very inefficient at angles approaching about 30° on account of reflected light losses, interference with adjacent prisms, etc. Moreover, it requires very deep prisms which present difficulties of manufacture. By the provision of prismatic members in accordance with the present invention it becomes possible to bend the light at angles considerably beyond 30° with a high degree of efficiency and freedom from stray light.

In accordance with one aspect of the invention, there is provided the combination of a triangular prism having angularly disposed reflecting and emitting faces, and a longitudinal converging lens at the base of the prism for causing incident, generally parallel rays to converge within the prism, the reflecting face of the prism being in the path of the converging rays from the lens and making therewith, at all points along the face, an angle of incidence greater than the critical angle so as to totally reflect the rays through the emitting face. One of said prism faces is preferably of a curvature to recollimate the rays into a narrow beam of generally parallel rays.

In accordance with another aspect of the invention, there is provided on the inner surface of a prismatic member, upon which light is incident, a plurality of contiguous longitudinal converging lenses, the outer surface of the member having thereon a plurality of longitudinal prisms having angularly disposed reflecting and emitting faces, one of said prisms being associated with each one of said lenses, the lenses causing incident generally parallel rays to converge within the members and strike the reflecting face of the associated prism at an angle of incidence greater than the critical angle so as to totally reflect the rays through the emitting face of the prism, the prisms being formed so that light emanates from each prism at a large angle without striking the next adjacent prism.

In accordance with still another aspect of the invention, there is provided on a prismatic member, concentrating or converging lenses on the inner surface which permit separation or spacing of prisms on the outer surface whereby the light incident on the inner surface is effectively utilized and directed into the prisms for total reflection at large angles in avoidance of adjacent prisms.

Further features and advantages of the invention will appear from the following detailed description of species thereof and from the drawings wherein:

FIG. 1 is a perspective view of a prismatic member comprising the invention;

FIG. 2 is a representation of a side or section of the prismatic member of FIG. 1 showing the refraction of incident parallel rays at a high angle of about 70°;

FIG. 3 is a view similar to FIG. 1 showing the refraction of rays from a point source or the center of a source of appreciable magnitude;

FIGS. 4a and 4b are views similar to FIG. 3 showing the effects of modifying the inclination of the emitting faces of the prisms;

FIG. 5 is a view similar to FIG. 3 showing the use of a prismatic converging lens;

FIGS. 6a, 6b and 6c are views similar to FIG. 3 showing modified forms of prisms arranged to refract the light at angles of about 60°;

FIG. 7 is a view similar to FIG. 3 showing a prism designed to reflect the light at a 50° angle;

FIG. 8 is a perspective view of a prismatic member having each of the lenses on one surface thereof arranged in inclined steps to provide a lifting or depressing action (depending upon the direction of inclination) in addition to the lateral bending of the light rays;

FIGS. 9 and 10 are, respectively, a horizontal section and a front end view, partly in section, of a refractor of circular cross section for street or highway luminaires and embodying bending prisms according to the present invention, the FIG. 9 section being taken along the line 9—9 in FIG. 10; and FIGS. 11 and 12 are a horizontal section and a front end view of half of a refractor or globe of ovate cross section, the FIG. 11 section of the refractor or globe being taken along the line 11—11 in FIG. 12 and showing a portion of the reflector to be used therewith.

Referring to FIGS. 1 and 2, the prismatic member 1 shown therein may be part of the surface of a larger prismatic member which may be of flat or curved contour such as the cover or globe of a luminaire. On its inner surface, upon which light is incident, the member is provided with a series of contiguous, longitudinal, converging or concentrating flutes or lenses 2, here illustrated as cylindrical with a center of curvature at C. On the outer surface of the prismatic member 1 there is provided a plurality of longitudinal prisms 3, one for each lens 2 and in apposition thereto. Each of the prisms 3 is comprised of angularly disposed reflecting and emitting faces 4 and 5 respectively. Each of the lenses 2 is formed to cause incident parallel rays 6 to converge within the member 1, and the prism face 4 is located in the path of the convergent rays at an angle such that the rays strike the reflecting face 4 at an angle of incidence greater than the critical angle so as to totally reflect the rays 6 through the emitting face 5. Since any glass body will absorb a certain percentage of the light passing through, total reflection means that substantially all the light transmitted is reflected.

As illustrated in FIG. 1, the prism face 4 is curved concavely with a radius of curvature 7 such as to provide approximate recollimation of the rays 6 into a narrow beam of generally parallel rays which are in this case bent or refracted at an angle of about 70° with respect to the principal axis 8 of the lens 2, the rays incident on the lens being parallel to the said principal axis 8. For precise control or collimation of the emitted beam, the reflecting surface 4 may be shaped as an involute.

It will be noted that the spacing and form of the prisms 3 is such that the light beam emanating from one prism misses the next adjacent prism. Also, by virtue of the fact that the lenses 2 are provided in contiguous or adjoining relationship they intercept all the light incident on the inner surface of the member 1 and, by severally concentrating the rays incident thereon, they permit spacing of the prisms 3 on the outer surface so as to avoid interference of the emergent beam from one prism with the next adjacent prism. However, it will be evident that, when desired, the lenses 2 may be spaced apart along the inner surface of the member 1 to permit a certain portion of the incident light rays to pass directly through the member 1 and out the flat surfaces 9 without refraction.

The prismatic members 1 may be formed of any suitable transparent material such as glass or plastic. A satisfactory plastic is, for example, an acrylic resin such as that marketed under the trademark Plexiglas and which has an index of refraction of 1.489 and a critical angle of about 42.5°.

While it is generally preferable that the emitting face 5 of the prism 3 be perpendicular to the beam of rays reflected from the face 4, it may be inclined thereto at an acute angle to provide either added or lessened refraction of the emitted beam, depending upon the angle of inclination of the face with respect to the reflected light.

FIG. 3 shows the effect of the prismatic member 1 on light rays 6a emanating from a point LC which is spaced from the prismatic member 1 a distance relative to the size of the lens 2 such that the rays 6a incident on the lens are only slightly divergent and nearly parallel. The light center LC is located on an extension of the principal axis 8 of the lens 2.

FIGS. 4a and 4b show the effect, in otherwise similar prismatic members 1b and 1c, of changing the slope of the emitting face 5b or 5c of the prism 3b or 3c. In FIG. 4b the prism face 5c is perpendicular to the parallel rays reflected from the face 4c so that the said rays issue from said face 5c without refraction. In FIG. 4a the face 5b is inclined at an acute angle to rays reflected from face 4b so that they are refracted toward the next adjacent prism.

In FIG. 5 the light-concentrating or converging member 2d is in the form of a prismatic lens in place of the cylindrical lenses in the preceding figures. The planar face 4d reflects the light in a diverging beam through emitting face 5d. If desired face 5d may be curved to recollimate the light.

FIGS. 6a, 6b and 6c show different modifications of prismatic members all designed to refract the light at an angle of about 50° from the principal axis 8 along which the light is incident upon lens 2e, 2f or 2g. In FIG. 6a the emitting face 5e of the prism 3e is substantially parallel to the axis 8 and at a substantial angle to the collimated beam reflected from the face 4e so that a substantial refraction of the emitted beam occurs at face 5e. The curvature of the lens 2e and the angularity of the reflecting face 4e are such in this case, that the said face 4e is curved along two separate radii 10 and 11 in order to accomplish more effective collimation of the reflected rays.

In FIG. 6b the size and curvature of lens 2f, the inclination and curvature of the reflecting face 4f and the inclination of emitting face 5f of prism 3f are varied from those of FIG. 6a, but are correlated to again effect a total refraction of the emitted beam of about 50°.

In FIG. 6c the curvature of lens 2g and the inclination and curvature of reflecting face 4g are such as to recollimate and bend the beam to an angle of about 50°, and the emitting face 5g of the prism 3g is inclined to be at right angles to the beam reflected from face 4g so that the beam is not refracted at said face 5g.

In FIG. 7 the reflecting face 4h is so correlated with the lens 2h as to provide refraction of the beam at an angle of about 60° through the emitting face 5h of the prism 3h.

In the modification shown in FIG. 8, each of the lenses 2i is effectively longitudinally inclined, by virtue of inclined segments 12, whereby the beam incident thereon is bent vertically upward in addition to the lateral bending effected by the reflecting face 4i through the emitting face 5i of the prism 3i.

FIGS. 9 and 10 show one example of application of the large angle redirecting prism, in accordance with the invention, to the refractor 15 of a street lighting luminaire which comprises also a suitable reflector 16 which is paraboloidal and ellipsoidal in contour, as shown, enclosing a lamp bulb indicated at 17 and having its light center at LC. The prisms of the invention are incorporated in sections 18 and 19 at the house side and street side, respectively, of the refractor 15 in order to effectively redirect up and down the street, light which might otherwise be directed to the front and rear of the luminaire and over the curb at each side of the street.

As indicated in FIGS. 9 and 10, the prisms in sections 18 and 19 are vertically disposed in vertical planes which are radial about the light center LC. In the section 18 at the house side of the refractor, the group of prisms indicated by the bracket 20 are designed to refract laterally, at 70°, light incident along the optical axis thereof and from the light center LC and the reflector 16, in the manner illustrated in FIG. 3 for example. The group 21 of prisms similarly refract light at 60°, the group 22 refracts at 50°, and the group 23 refracts at 40°. Similarly, in the section 19 at the street side of the refractor, the group 24 of prisms refracts light at 70°, the group 25 at 60°, the group 26 at 50° and the group 27 at 40°. it will be understood that one could provide prisms which would individually and successively graduate in refracting power rather than groups as indicated. The remaining surfaces of the refractor 15 between house side and street side may be provided with conventional light refracting elements to provide a desired distribution of light over the roadway as is well understood in the art.

FIGS. 11 and 12 illustrate, somewhat diagrammatically, an application of the new prisms to an ovate refractor 30. As illustrated therein, the street and house sides of the refractor 30 are provided with groups of large angle prisms of the invention which are slanted with respect to the vertical as shown in FIG. 12, to provide vertical (downward) redirection in addition to the large angle lateral redirection illustrated in FIG. 11. At the street side thereof, the refractor 30 is provided with groups of prisms of decreasing refraction away from the vertical median plane M—M, including a group of 70° prisms represented by the prisms 31 and 32 (like those shown in FIG. 3), a group of 60° prisms represented by the prism 33, and a group of 50° prisms represented by prism 34. Similarly, the house side of the refractor 30 is provided with a group of 70° prisms represented by prisms 35, 36 and 37, a group of 60° prisms represented by prism 38, and a group of 50° prisms represented by prism 39. It will be noted that the respective prisms are so oriented that the optical axis thereof (like axis 8 of prism 31) is aligned with the light center LC of the refractor 30 (which light center is in the median plane M—M and above the plane of the FIG. 11 drawing) so that the rays from the light center (see ray 40) are properly concentrated by the lens portions of the prisms (lens 2 of prism 31) and redirected by the reflecting faces (face 4 of prism 31) at the desired angle.

While the use of the prisms in the ovate refractor has been so far described with the distribution of light direct from the source, it is desirable to use an optically round, mechanically ovate reflector 41 positioned above the refractor to reflect the light, thereby redirecting the reflected light at the same lateral angle as the direct light. To this end the downwardly concave reflector 41 is provided with radially stepped sections 41a–41e which are circular in horizontal cross section about LC. These sections may be advantageously applied to the house or street sides of the reflector or both sides to utilize light which might otherwise be lost as far as the roadway is concerned.

The remaining surfaces of the refractor 30 may be provided with conventional redirecting prisms in a manner well known in the art. For example, the sides of the refractor may include conventional redirecting prisms in the areas represented by brackets 42 and 43, and lifting prisms in the area represented by bracket 44.

While the large angle prisms are illustrated only in use mainly for laterally redirecting the light in a luminaire, it is apparent to one skilled in the art that such may be used near the bottom of a refractor for vertical redirection in luminaires and would also be useful in many other fields. Therefore, certain modifications with-

What we claim as new and desire to secure by Letters Patent of the United States is:

1. In a luminaire, a light source and a light-refracting member arranged to transmit light from said source, said member having on the inner surface thereof upon which light from said source is incident, a plurality of adjacent longitudinal converging lenses for causing incident light rays to converge within said member, the outer surface of the member having thereon a plurality of longitudinal prisms having angularly disposed reflecting and emitting faces, one of said prisms being associated with each one of said lenses, the lenses each causing incident rays from said source to converge within the member and strike the reflecting face of the associated prism at an angle of incidence greater than the critical angle so as to totally reflect the rays through the emitting face of the prism in avoidance of the next adjacent prism, each of said lenses being oriented so that its principal axis is in alignment with the center of said light source, and the size of each lens being so small relative to its distance from the light source that rays incident thereon from the center of said source are generally parallel to the principal axis of the lens.

2. The combination set forth in claim 1 wherein the reflecting faces of said prisms are curved to recollimate the rays reflected thereby into a narrow beam of generally parallel rays.

3. A luminaire for placement along the side of a roadway comprising a light source disposed centrally in a reflector which is, at least in part, circular in horizontal cross section so as to reflect light generally in a radial plane and a refractor positioned below the reflector to intercept the light emitting from the light source, said refractor having on an inner surface thereof a longitudinal converging lens adapted to effect convergence of generally parallel rays incident thereon and on an outer surface thereof a longitudinal prism in apposition to said lens and comprising angularly disposed light reflecting and emitting faces, the reflecting face of said prism being in the path of the convergent rays from said lens and making therewith an angle of incidence greater than the critical angle so as to totally reflect the rays through the emitting face of said prism.

4. A luminaire as set forth in claim 3 wherein said refractor is circular in horizontal cross section and having said prisms incorporated in a house side section and a street side section, the refracting power of the prisms in both said sections being graduated from a median plane through the luminaire perpendicular to the roadway so as to provide the greatest amount of refraction of the light nearest said median plane.

5. A luminaire as set forth in claim 3 wherein said refractor is ovate in horizontal cross section and said reflector comprises a series of radially-stepped sections which are circular in horizontal cross section.

References Cited

UNITED STATES PATENTS

| | | | |
|---|---|---|---|
| 720,386 | 2/1903 | Wadsworth | 88—60 |
| 755,196 | 3/1904 | Wadsworth | 88—60 |
| 804,254 | 11/1905 | Muggatt | 240—106 |
| 2,721,931 | 10/1955 | Franck | 240—106 |
| 2,798,411 | 7/1957 | Coleman | 88—57 |

NORTON ANSHER, *Primary Examiner.*

JOSEPH F. PETERS, JR., *Assistant Examiner.*